Feb. 9, 1960

C. L. FARRAND ET AL 2,924,768

MACHINE TOOL CONTROL WITH COMPENSATION
FOR NON-LINEAR GUIDE WAYS

Filed Aug. 27, 1956

CLAIR L. FARRAND &
ROBERT W. TRIPP,
INVENTORS.

BY W. E. Beatty

ATTORNEY.

Feb. 9, 1960     C. L. FARRAND ET AL     2,924,768
MACHINE TOOL CONTROL WITH COMPENSATION
FOR NON-LINEAR GUIDE WAYS
Filed Aug. 27, 1956     4 Sheets-Sheet 4

CLAIR L. FARRAND &
ROBERT W. TRIPP,
                 INVENTORS.

BY W. E. Beatty

ATTORNEY

United States Patent Office 2,924,768
Patented Feb. 9, 1960

2,924,768
MACHINE TOOL CONTROL WITH COMPENSATION FOR NON-LINEAR GUIDE WAYS

Clair L. Farrand and Robert W. Tripp, Bronxville, N.Y., assignors, by mesne assignments, to Inductosyn Corporation, Carson City, Nev., a corporation of Nevada Application August 27, 1956, Serial No. 606,263

8 Claims. (Cl. 318—480)

This invention relates to a photo electric guide for machine tools and more particularly to the control of scribing or cutting tools in such machines in order to generate long straight or curvilinear lines or surfaces held to very close tolerances. The invention is of particular advantage in the case of large machine tools adapted to handle large workpieces on which long lines or cuts are to be made. An object of the invention is to compensate for errors in the physical structure of such machines which would otherwise inhere in the lines generated thereby. More particularly, an object of the invention is to compensate for curvature in the ways of such a machine down which moves a carriage supporting the scriber or cutting tool for generation of a desired line or surface on a workpiece supported on the machine bed. A further object of the invention is to generate reference lines and also curvilinear lines referred to such reference lines with a very high degree of accuracy over distances of the order of one hundred feet or more, as is desired, for example, in certain phases of airframe construction.

These objects are accomplished by producing a correction signal in accordance with the departure of the tool path from linearity as the carriage proceeds along the guide ways. Preferably, this correction signal depends upon both the magnitude and the direction of the curvature in the ways of the machine. The fine increments of position are preferably defined by means of a position measurement transformer and the instruction to it is modified either electrically or mechanically to compensate for the magnitude and direction of the unwanted departure from the base line. Several embodiments of method and means are disclosed for this purpose.

For further details of the invention, reference may be made to the drawings wherein—

Figs. 1–3 are respectively plan diagrammatic views of three embodiments of the invention;

Figure 2:
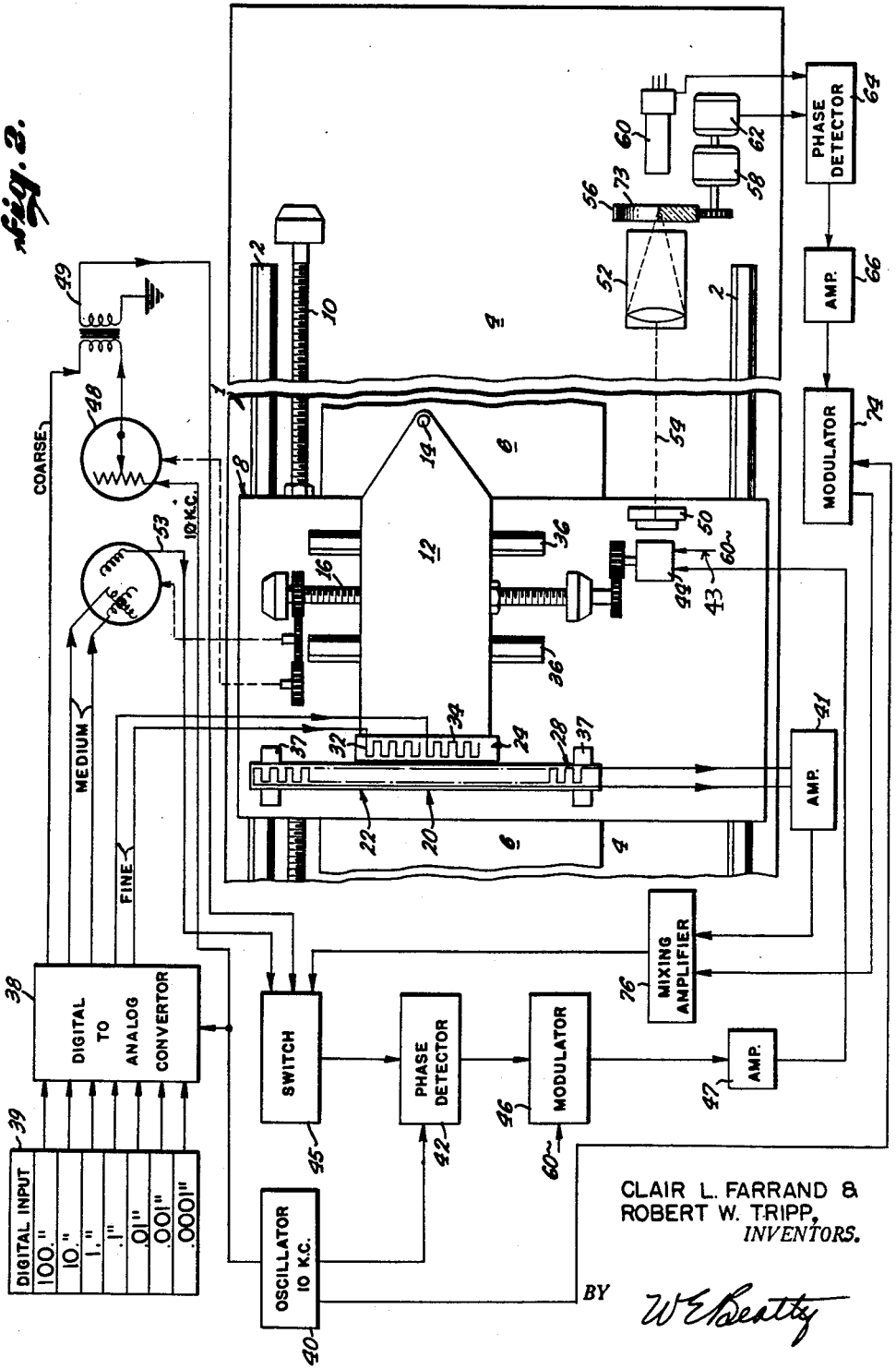

In Fig. 1 there is shown at 2 a pair of guide ways belonging to a machine 1 whose bed is indicated at 4, the latter supporting a workpiece 6. A carriage 8 rides on the ways 2, driven for example by means of a lead screw 10. The drive for the lead screw may be conventional and is not shown. The carriage 8 supports on suitable cross ways 36 transverse to the ways 2 a cross slide or secondary carriage 12 on which is mounted a scriber or cutting tool indicated at 14, capable of engagement with the workpiece 6. The scriber or cutting tool may of course be of any form, for example a rotating cutter. A lead screw 16 journaled at bearings in the carriage 8 engages the cross slide at a nut 18.

Due to the inevitable imperfections of manufacture, the ways 2 depart from geometric straightness, and accordingly a line scribed or a surface cut on the workpiece by the tool 14 with motion of carriage 8 down the ways 2 will incorporate the errors in the straightness of ways 2 unless the transverse position of the cross slide 12 is adjusted to compensate for such errors.

The position of the tool 14 crosswise of ways 2 is defined, as to fine incerments of position, by means of a position measurement transformer generally indicated at 20, which may be of the type disclosed in the copending application Serial No. 509,168, filed May 18, 1955, for Positioning Measuring Transformers, assigned to the assignee hereof.

Figure 4:
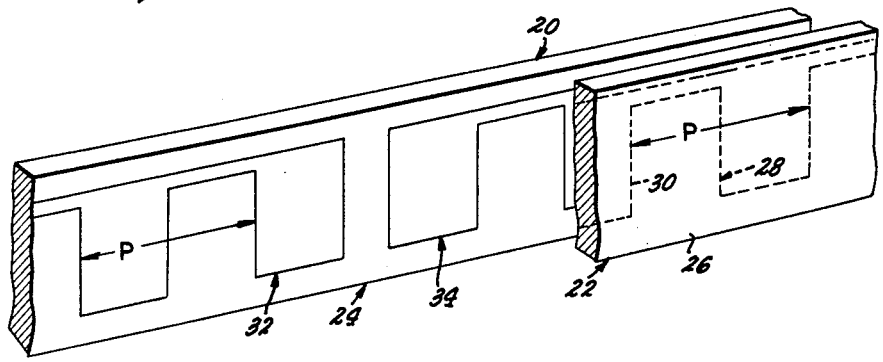
Fig. 4 is a fragmentary diagrammatic perspective view of a position measurement transformer suitable for use in the invention.

Such a transformer is illustrated at 20 in Fig. 4. It comprises two inductively related members generally indicated at 22 and 24, arranged for relative motion parallel to their long dimensions and with a small constant spacing between them. Member 22 includes a support 26 of non-conducting material having a plane surface presented to member 24. On support 26 there is provided a multipolar winding, shown in phantom in Fig. 4 and generally indicated at reference character 28. Winding 28 includes a multiplicity of conductors 30 which are uniformly spaced and which extend transversely of the direction of relative motion of the members 22 and 24. These conductors are interconnected into a series circuit or winding to provide opposite directions of current flow in adjacent elements of the conductors 30.

For one sense of current flow through the entire winding the direction of the lines of magnetic force associated with each of the conductors 30 in the space between the two members alternates from conductor to conductor, so that the space from one conductor to the second next conductor may be referred to as a magnetic pole cycle, identified by the dimension P in the figure.

Member 24 bears on its face adjacent member 22 two windings 32 and 34 each of which may be similar to the winding 28, positioned with respect to each other, however in space quadrature of the pole cycle P, which is the same for all three windings. If now windings 32 and 34 are energized with cophasal A.C. currents, which may for example be of the order of 10 kc. in frequency, the amplitudes of the A.C. voltages which they respectively induce in the winding 28 will be cyclical functions of the relative position of the two transformer members, cyclical in a change of relative position equal to P. By suitable refinements in the spacing and dimensioning and interconnection of the conductors of the windings which are described in the copending application Serial No. 509,168 referred to above, but which refinements are not necessary for an understanding of the present invention, these coupling functions, i.e., the ratios of secondary voltage to primary current can be made not only approximately but accurately sinusoidal.

If therefore windings 32 and 34 are energized with currents which are related as the sine and cosine of any angle between zero and 360°, there exists a relative position of the two transformer members, cyclical in the distance P, for which the total voltage induced in winding 28 is a maximum, and likewise a cyclical relative position for which the total induced voltage is zero, the combined coupling wave being also sinusoidal and cyclical in P. These two sets of relative positions are of course a quarter of a pole cycle apart. Servo-mechanism may then be used to drive the two transformer members with respect to each other until, for any pair of input signals to member 24, the output or "error" signal from member 22 is a maximum or, preferably, zero.

The winding 28 is in general substantially longer than the member 24 so that the member 24 can be moved lengthwise of member 22 through a plurality of pole cycles throughout all of which all conductors of windings 32 and 34 are opposite portions of the winding 28.

In the apparatus of Fig. 1, the two-winding transformer member 24, sometimes called for convenience a slider, is affixed to the cross slide 12, and its windings are the primary windings of the transformer as there used. The member 22 is supported on bearing blocks 37 on carriage 8 for motion with respect to carriage 8 parallel to the secondary or cross ways 36. The two members can however be interchanged in position.

For fine increments of travel of the cross slide 12, its position may be described in terms of the pole cycle P of the transformer 20, and in particular in terms of the pole cycle of its member 22 as referred to a zero position for that member with respect to the machine bed, presently to be described. The pole cycle of the transformer is divisible into any desired number of parts such as 360° and fractions thereof. To drive the tool 14 to a specified position within this cycle, the windings of member 24 are energized with position command signals in the form of cophasal currents related to each other in amplitude as the sine and cosine of the angle which describes the desired cross slide position. The net voltage induced in the winding of member 22 then constitutes an error voltage which is employed in a servosystem to operate servomotor 44 and shift the slide 12 until this error signal goes to zero.

The sine and cosine currents of these relative amplitudes are generated for the quadrature windings of transformer member 24 in a computing unit 38 which accepts a reference voltage, for example of 10 kc., from an oscillator 40 and which may include push button, perforated tape or other controls for developing therefrom, as designated in the linear input data 39, two currents thus representative, to any desired degree of accuracy, of angle α from zero to 360°. The computing unit 38 converts the digital values set up in the input 39 into analog values for operating the coarse, medium and fine data elements 48, 51 and 20 respectively and this computing unit is thus a digital-to-analog converter. In the figures, the electrical interconnections of the various components are for simplicity indicated functionally only, without indication of the number of conductors required, which depends upon the scheme of wiring adopted. These are matters well known in the art.

Apparatus of a type suitable for the computer 38 is disclosed in co-pending application S.N. 536,465 filed September 26, 1955, for Thermal Compensation which discloses and claims the correction of thermal errors arising in relatively positioning a tool and a work piece. The computer 38 with its linear input 39 and reference oscillator 40 for producing coarse and medium signals and for producing fine signals in the form of the sine and cosine of the angle which corresponds to the linear position designated in the input 39 is disclosed and claimed in application S.N. 540,429 filed October 14, 1955, for Automatic Machine Control and assigned to the assignee hereof.

The following control for screw 16, including input 39, converter 38 and the elements controlled thereby may in like manner be employed to operate lead screw 10 to position carriage 8 lengthwise of the machine.

As disclosed in said application S.N. 540,429, such coarse control may include a source of 10 k.c. voltage and a helical potentiometer is indicated at 48, coupled to the lead screw 16, to permit comparison in coarse terms of the instantaneous position of carriage 12 with that defined by such a coarse position command signal, the difference between the coarse position command signal and the output of potentiometer 48 constituting a coarse error signal which is supplied over the line 49 to the switch 45. The computer 38 may also include elements for developing a position command signal, for example 10 k.c., representing medium increments of position for the lead screw 16. As disclosed in said application S.N. 540,429, such medium control may include a medium resolver 51 coupled to the lead screw 16 and supplying its error signal over line 53 to the switch 45. The switch 45 is of known type for driving the lead screw 16 in response successively to the medium and coarse error signals in lines 53 and 49 respectively, while the switch 45 drives the cross slide 12 in response to the fine error signal which is fed from transformer element 22 through amplifier 41, phase detector 42, modulator 46 having a source such as 60-cycles indicated, and line 55 to amplifier 47. Switch 45 operates to control the servo motor 44 by the coarse and medium error signals 49 and 53 until such signals are reduced to a value representing a position error not greater, for example, than ¼ of a full cycle of transformer 20. Thereupon the switch 45 operates to shift the control of servo motor 44 to the fine position command signals of computer 38 and the error signal from transformer member 22.

When the cross slide 12 is under the control of transformer 20, the error voltage from member 22, amplified as necessary in an amplifier 41, is passed to a phase detector 42. Here its phase relation to the voltage from oscillator 40 (whether zero or 180°) is determined for indication of the sign of the position error of tool 14, i.e., whether cross slide 12 is short or long of its intended position crosswise of the ways 2 as specified by the position command signals from computer 38. The output of phase detector 42, which may be a D.C. voltage of sign and magnitude according to the sign and magnitude of the error in cross slide position, is then applied to motor 44, for example via a modulator 46 which develops for motor 44 one phase of a 60-cycle energizing voltage of polarity and magnitude appropriate to the rotation to be made by the motor, the motor receiving on another winding a 60-cycle voltage of constant phase indicated by line 43. The output of modulator 46 reaches motor 44 via switch 45 and an amplifier 47.

To correct the position of the cross slide 12 in order to compensate for curvature of the ways 2, an optical servo-system is provided for operation on the position of the secondary transformer member 22. Attached to the member 22 there is provided an illuminated target 50, which is a point source of light. For example, target 50 may be in the form of an opaque mask whose plane is perpendicular to the length of ways 2, the mask having a small opening through which light can pass. A telescope 52 is supported at one end of the machine on bed 4 with its optical axis 54 parallel to the nominal direction of ways 2. This optical axis constitutes the reference line to which is controlled the position of member 22 and hence of the cross slide 12 and tool 14. To this end, the target 50 is so supported from member 22 that the center of the target may be brought onto the axis 54 by motion of member 22 in its bearing blocks 37.

With the target so centered on axis 54 and with the carriage 8 at one end of ways 2, the relative position of member 22 and carriage 8 may be considered to define a zero reference between the two, this relative position changing on motion of the carriage 8 with departure of ways 2 from parallelism with axis 54.

An image of target 50 is formed by telescope 52 in its focal plane, on the telescope axis when the target is on axis and displaced therefrom when the target is off axis.

Associated with the telescope 52 there are provided means for developing a signal indicative of departures of the target 50 from axis 54, in particular, in the embodiment illustrated, departures parallel or substantially parallel to the cross ways 36 which define the direction of relative motion of the transformer members 22 and 24. The departures of interest are therefore departures from a plane which contains the axis 54 and which is transverse and substantially perpendicular to the cross ways 36. The signal thus developed is, in the embodiment of Fig. 1, employed to energize a servomechanism including servo motor 44 and operating to correct the position of member 22 with respect to carriage 8, transformer 20 then further correcting the position of slide 12 and tool 14 through the servomechanism which terminates with motor 44.

In the embodiment of Fig. 1 this signal developing means comprises a rotating mask 56 driven by a motor 58, a photocell 60, a generator 62 and a phase detector 64. The output signal from the phase detector, amplified if necessary in an amplifier 66, is used to control a motor 68 coupled between carriage 8 and member 22, for example through the operation of a modulator 70. The motor 68 drives a lead screw 72 which threadedly engages a nut 71 affixed to transformer member 22. The gear ratio between generator 62 and the mask 56 is one-to-one.

Figure 5:
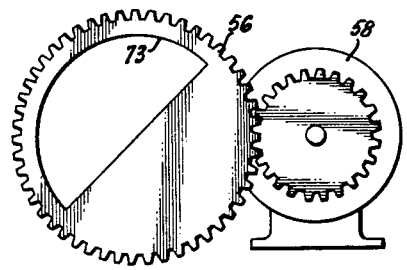
Fig. 5 is a view in elevation of a rotating mask suitable for use in the embodiments of Figs. 1, 2 and 3.

The mask 56 is shown in elevation in Fig. 5. It comprises an opaque plate mounted for rotation in its own plane, perpendicular to the telescope axis, about a center passing through the plate. The plate is apertured over a semicircular area 73 concentric with this center of rotation and bounded by a diameter passing through it. The mask is supported in suitable bearings, not shown, to position its center of rotation on the telescope axis 54, and the mask is driven by means of a motor 58 which is coupled thereto and which is further coupled to a generator 62.

A photocell 60 is positioned behind the mask with its photosensitive surface centered on the optical axis of the telescope. When target 50 is on the axis 54, the illumination of the photocell produced by the target is independent of the angular position of the mask so that the photocell output signal contains no A.C. component. For other positions of the target, the photocell output will contain an A.C. component having the same frequency as the rate of rotation of the mask and having a magnitude and phase indicative of the magnitude and direction of the departure of the target from axis 54.

To derive from this A.C. output signal, a signal indicative of the departures of interest, i.e., those parallel to cross ways 36, a reference signal is generated in the generator 62. This is a sinusoidal A.C. voltage having the same frequency as the rate of rotation of the mask 56 and phased to pass through its maxima and minima when the diametral edge of the transparent portion of the mask is vertical, i.e., perpendicular to cross ways 36.

The output signals from generator 62 and photocell 60 are then applied to a phase detector 64. This may, though it need not, be of the same type as the phase detector 42, and the modulator 70 may also be of the same type as modulator 46.

Phase detector 64, amplifier 66 and modulator 70 togeter with motor 68 drive the transformer member 22 until the target 50 lies in a plane containing axis 54 and perpendicular to cross ways 36. When the target 50 lies in this plane, the error signal developed in the photocell 60 is zero, i.e., the photocell output contains no A.C. component resolvable into a component either in or out of phase with the reference voltage developed in generator 62. While the photocell output will in general contain a component representative of vertical departures of target 50 from axis 54, this component will not produce any output signal from phase detector 64 since it is in quadrature with the reference voltage applied to the phase detector by generator 62.

For the tool 14, therefore, transverse positions on the machine 1 may thus be measured, for example in the plane of bed 4, from the axis 54 or from the projection of that axis onto the plane of the bed. A program of positions for the tool, which may for example comprise a single position to be held throughout one complete travel of carriage 8 throughout the length of the workpiece, is set up in terms of fine position command signals for the transformer 20 with regard to the position of slide 12 cross wise of carriage 8, and in terms of medium and coarse position command signals for comparison with the output of the medium resolver 51 and helical potentiometer 48 or other device indiacting the general position of carriage 8 lengthwise of ways 2. If instead a curvilinear line or surface is to be scribed or cut upon the workpiece, the program of positions for the cross slide 12 may include a succession of continuously or discontinuously varying values, in both coarse and fine terms, set up in the input 39 and computer 38 as functions of time or of the position of the carriage 8 lengthwise of ways 2.

Fig. 2 illustrates an embodiment of the invention in which the correction for curvature of the machine ways is effected by means of a signal representative of departures of the carriage from a path parallel to the telescope line of sight, which signal is combined with the error signal output of the position measurement transformer employed for control of the position of the cross slide on the main carriage. In Fig. 2, the target 50 is affixed to the carriage 8 in position to lie on the axis 54 of a telescope 52 supported on the machine bed when, for example, the carriage is at one end of the ways 2. The one-winding transformer member 22 is affixed to carriage 8 while the two-winding member 24 is fastened to the cross slide 12, or vice versa. The lateral position of slide 12 with respect to bed 4 is, therefore, referred to the axis or line of sight 54, and with the target on that axis, energization of member 24 with position command signals appropriate to a desired position for the cross slide will bring to zero the total voltage induced in member 22 when the cross slide is so positioned.

Deviations, in the plane of the bed 4 (assumed parallel to cross ways 36), of carriage 8 from motion parallel to axis 54 are employed to develop a compensating or artificial error signal cophasal with the position command signals applied to member 24. This compensating signal is proportional to departures of target 50 from axis 54 parallel to cross ways 36 in the same manner (but with opposite polarity) as the error voltage developed in member 22 is proportional to positional error between the two transformer members which gives rise to it.

Addition of this compensating voltage to the error voltage from member 22 results in a net zero error voltage for control of the servo motor 44 when that motor drives the cross slide 12 to a location such that the positional relation of members 22 and 24 differs from that defined by the position command signals applied to member 24 by the amount of the departure of target 50 from axis 54. The zero reference for the fine position command signals is again that which locates target 50 on axis 54.

In the particular form of the invention illustrated in Fig. 2, this compensating voltage is generated in a modulator 74. Modulator 74 is fed with the output of oscillator 40 and also with a modulating signal derived from the departures of the image of target 50 from axial position in telescope 52. The modulating signal is shown as derived from the same form of apparatus as that shown in Fig. 1 for the development in Fig. 1 of a control signal for the motor 68 there employed to drive transformer member 22 of that figure. Thus in Fig. 2 there is provided a rotating mask 56, motor 58, generator 62, photocell 60, phase detector 64 and amplifier 66. These may be similar with the correspondingly numbered elements in Fig. 1 although, of course, they need not be.

The output signal from modulator 74 is a voltage cophasal with the error voltage, if any, developed in transformer member 22, and having a polarity and amplitude representative of the sign and amount of the deviation of target 50 from axis 54 parallel to cross ways 36. This compensating signal is combined with the error signal from member 22 in a suitable adding device 76 which may for example take the form of a mixing amplifier. The sum obtained in device 76 is then employed for controlling the energization of servo motor 44 as in the embodiment of Fig. 1 via coarse-fine switch 45, a phase detector 42, modulator 46, and amplifier 47.

Conventional methods and apparatus may be employed properly to correlate the levels of the signals combined in the adding device 76, where the two inputs must have the same relation to linear displacements, in the one case to displacements between transformer members 22 and 24 and in the other case to the projected departure of target 50 from axis 54 onto a plane parallel to the cross ways 36. An amplifier 41 is shown for this purpose although alternative apparatus may be elsewhere employed.

As illustrated, the embodiment of Fig. 2 is capable of compensating for departures of the ways 2 from straightness (as projected onto a plane containing cross ways 36 for example) amounting to a minor fraction of a pole cycle in transformer 20. For accurate performance, the position errors of the carriage due to curvature of the ways to be thus compensated for should not exceed the fraction of the pole cycle of transformer 20 over which, in the vicinity of its zero and 180° points, the sinusoidal error signal induced in member 22 by displacements of the transformer members from the positional relation defined by the command signals to member 24 is approximately linear.

Figure 3:
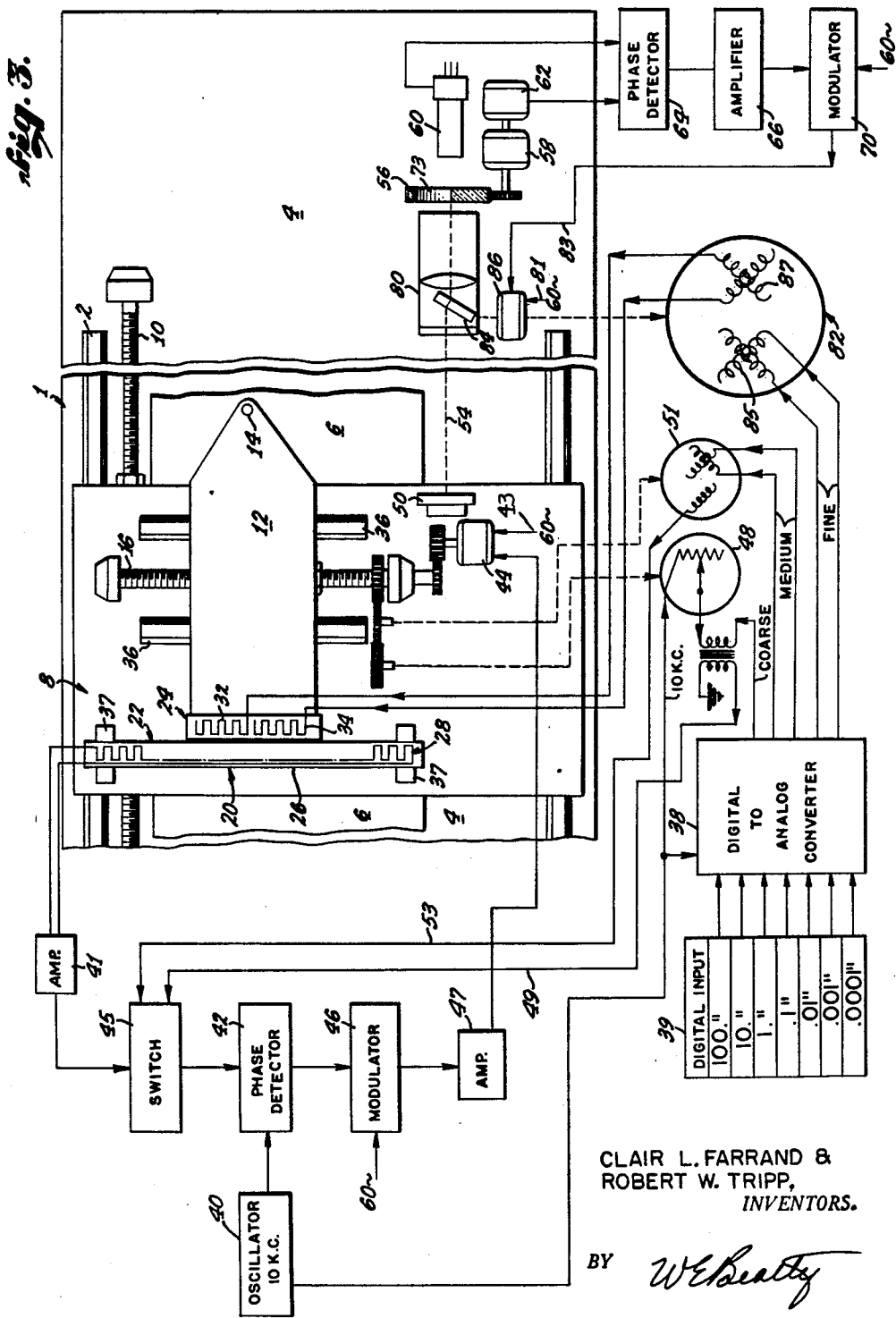

Fig. 3 illustrates still another embodiment of the invention, in some respects similar to that of Fig. 2, but particularly suitable for applications in which large deviations of the main machine carriage must be provided for. The arrangement of transformer 20, carriage 8, cross slide 12 and target 50 is the same as in Fig. 2. Associated with a telescope 80 on the machine bed, which differs in a manner presently to be explained from the telescope 52 of Figs. 1 and 2, are a rotating mask 56, motor 58, generator 62, photocell 60 and phase detector 64, all of which may be similar to the similarly numbered elements in the embodiments of Figs. 1 and 2.

In Fig. 3, however, the photocell A.C. signal is employed to alter the fine position command signals employed to energize the position measurement transformer member 24, so as to shift the relative position of the transformer members for which zero error signal will be developed in member 22 which is fixed to the carriage 8 as in Fig. 2. For this purpose, the photocell output signal is employed, with a suitable servomechanism including servo motor 86, to drive a resolver 82 through which are passed the fine position command signals from the computer 38 prior to their application to position measurement transformer 20, this servomechanism also driving a plane parallel plate 84 between the objective of telescope 80 and the target 50. The plate 84, sometimes referred to as a micrometer flat, is pivoted for rotation about an axis perpendicular to the cross ways 36 and is linked to the resolver 82 through a motor 86 which constitutes the last element in the servomechanism just referred to. The motor 86 may be of the same type as the motor 44, energized on one phase by a power line voltage indicated at 81, and on the other phase indicated at 83 by a power line frequency voltage developed in modulator 70. The motor 86 is controlled by the output of phase detector 64 via an amplifier 66 and modulator 70.

The resolver 82, schematically shown in Fig. 3, is a device including a pair of primary windings 85 in space quadrature relation and a pair of secondary windings 87 also in space quadrature relation, one quadrature pair forming a stator and the other pair forming a rotor. Motor 86 is coupled to the rotor of the resolver 82. The two fine position command voltages developed by computer 38 may be applied either to the two rotor windings or to the two stator windings of resolver 82.

The windings energized by the computer 38 will constitute the primary windings 85. The amplitude of the voltage induced by either primary winding in either secondary winding is a sinusoidal function of rotor-stator position. The resolver may for example be so constructed that these coupling functions go through one cycle for one revolution of the rotor with respect to the stator, although resolvers may also be constructed in which these coupling functions are cyclical in fractions of a rotor-stator revolution. The quadrature relation of the two windings of either rotor or stator is, of course, with respect to the angular increment in rotor-stator position over which the coupling functions go through one complete cycle. Resolvers in general are described for example in volume 17 of the M.I.T. Radiation Laboratory Series at pages 340–344. In particular the resolver 82 of Fig. 3 may advantageously be constructed in accordance with the disclosure of the copending application Serial No. 536,464 filed September 26, 1955, for Microsolver, which is assigned to the assignee hereof.

The two primary windings 85 of resolver 82 are accordingly energized by computer 38 with fine position command signals in the form of cophasal currents related as the sine and cosine of an angle $\alpha$, say, representing a desired position of the tool 14 in terms of a positional relation of transformer members 22 and 24 within a pole cycle of member 22 selected by the coarse positioning apparatus, not shown. This coarse positioning apparatus, and that employed in Fig. 2, may be of the type briefly described as suitable for use in the embodiment of Fig. 1.

The voltages developed in the secondary windings 87 of the resolver 82 will be cophasal voltages related as the sine and cosine of an angle $\alpha+\beta$, say, where $\beta$ is (for the one cycle per revolution resolver assumed) the rotation imposed by servomotor 86 on the rotor of resolver 82, $\beta$ being related to 360° as the horizontal displacement of target 50 is related to the linear length of the pole cycle P of transformer 20.

The linkage between plate 84 and resolver 82 via motor 86 is such that when plate 84 is perpendicular to the axis 54, imposing no deviation thereon, the primary and secondary windings of the resolver 82 are effectively geometrically parallel in pairs. Under these conditions the angle $\beta$ above referred to is zero. The linkage is further such that for one complete electrical cycle of the resolver 82, i.e., for a change in rotor-stator angle such that the angle $\beta$ changes by 360°, the plate 84 will have rotated through an angle such that the lateral deviation imposed by it on axis 54 is equal to one pole cycle of the transformer 20.

Suitable couplings must be provided between the rotation of motor 86 and the coarse position command signal generating apparatus 48 and 51 in order that the coarse error signal at switch 45 may be kept below the level at which switch 45 transfers control of servo motor 44 from the fine to the coarse position error signals. This is because in normal operation, the coarse error signal is active only when the cutting or ruling operation is first begun, and thereafter (unless the ways are extremely bad) the fine error signal is entirely adequate to take care of the maximum deviation. If the machine is stopped and the position of the carriage is changed, the coarse error signal is again active when the machine is re-started. For example, if the source of the coarse position command signal in computer 38 is a potentiometer energized by a 60-cycle voltage, so that there may be tapped from this potentiometer a voltage for comparison with the output of the helical potentiometer 48 coupled between lead screw 16 and carriage 8, the potentiometer in computer 38 from which the coarse command signal is taken may itself be fed with a voltage taken from a potentiometer whose tap is mechanically linked to the motor 86.

While the invention has been described herein in terms of three preferred embodiments, numerous variations may be made in the apparatus illustrated in the drawings and herein described without departing from the invention as set forth in the appended claims. The various servomechanisms described have been included for illustrative purposes only; obviously they can take any one of a wide number of forms. As an example of such a variation applicant will mention the possibility for combining in the embodiments of Figs. 1 and 3 the functions of the phase detector 64, modulator 70 and motor 68 (of Fig. 1) or motor 86 (of Fig. 3) in a single device. If the mask 56 is driven at synchronous speed, the motors 68 and 86 may take the form of synchronous motors, one phase of which is energized by the power line employed in driving motor 58 and the other phase of which is the A.C. component of the photocell output, suitably amplified. Other photo electric controls may be used.

The invention is, of course, also susceptible of extension to three dimensions.

We claim:

1. In a machine having a carriage movable along guide ways and a cross slide movable with respect to the carriage along cross ways on the carriage transverse to said guide ways, means to maintain said cross slide on a path lying in a plane generally parallel to said guide ways and transverse to said cross ways, said means comprising a telescope fixed with respect to and having its axis substantially parallel to said guide ways, a target mounted on said carriage, means to detect departures of said target from said axis, and means to correct the position of said cross slide in accordance with said departures.

2. In a machine having a carriage movable along guide ways and a cross slide movable with respect to the carriage along cross ways on the carriage transverse to said guide ways, means to maintain said cross slide on a path lying in a plane generally parallel to said guide ways and transverse to said cross ways, said means comprising a telescope fixed with respect to and having its axis substantially parallel to said guide ways, a target mounted on said carriage, means to detect departures of said target from said axis parallel to said cross ways, and means to correct the position of said cross slide in accordance with said departures.

3. In a machine having a carriage movable along guide ways and a cross slide movable with respect to said carriage on cross ways extending transversely of said guide ways, means to control said cross slide with reference to a straight line upon motion of said carriage, said means comprising a telescope fixedly arranged with respect to said guide ways with its axis substantially parallel to said guide ways, a target movable with said carriage along said guide ways, means to develop a signal representative of the lateral departure of said target from said axis lengthwise of said cross ways, and means responsive to said signal to move said cross slide along said cross ways a distance equal and opposite to said departure.

4. In a machine having a carriage movable along guide ways and a cross slide movable with respect to said carriage on cross ways extending transversely of said guide ways, means to control said cross slide with reference to a straight line upon motion of said carriage, said means comprising a telescope fixedly arranged with respect to said guide ways with its axis substantially parallel to said guide ways, a two-member position measurement transformer arranged with one member affixed to said cross slide and the other member mounted on said carriage for motion with respect thereto parallel to said cross ways, a target affixed to said other member in position to be alignable with said axis, means to energize one of said members with input signals representative of a positional relation of said members for which a specified value of error signal is induced in the other of said members, servomechanism operable on said error signal to drive said cross slide until said error signal assumes said specified value, photoelectrically operated means to develop from the image of said target formed in said telescope a signal representative of lateral departures of said target from said axis lengthwise of said cross ways, and servomechanism operable on said last named signal to drive said other member with respect to said carriage to maintain said target on said axis.

5. In a machine having a carriage movable along guide ways and a cross slide movable with respect to said carriage on cross ways extending transversely of said guide ways, means to control said cross slide with reference to a straight line upon motion of said carriage, said means comprising a two-member position measurement transformer of which one member is affixed to said cross slide and the other is affixed to said carriage, means to energize one of said members with signals representative of a positional relation of said members for which a specified value of error signal is induced in the other of said members, servomechanism accepting said error signal as an input signal and adapted to drive said cross slide until said members assume said positional relation, a telescope fixedly arranged with respect to said guide ways with its axis substantially parallel thereto, a target affixed to said carriage in position to be alignable with said axis, photoelectrically operated means to develop from the image of said target formed by said telescope a signal representative of lateral departures of said target from said axis and transverse to said cross ways, means to develop from said last-named signal another signal of the same form as the error signal developed in said other transformer member upon departure of said members from said positional relation but of opposite polarity, and means to combine said last-mentioned two signals at the input to said servomechanism.

6. In a machine having a carriage movable along guide ways and a cross slide movable with respect to said carriage on cross ways extending transversely of said guide ways, means to control said cross slide with reference to a straight line upon motion of said carriage, said means comprising a two-member position measurement transformer of which one member is affixed to said cross slide and the other is affixed to said carriage, energizing means to energize one of said members with signals representative of a positional relation of said members for which a specified value of error signal is induced in the other of said members, servomechanism accepting said error signal as an input signal and adapted to drive said cross slide until said members assume said positional relation, a telescope fixedly arranged with respect to said guide ways with its axis substantially parallel thereto, a target affixed to said carriage in position to be alignable with said axis, said telescope including in advance of its objective a plane parallel plate pivoted for rotation about an axis substantially perpendicular to said cross ways, photoelectrically operated means to develop from the image of said target formed by said telescope a signal representative of the difference between the departure of said target from a plane containing said axis and perpendicular to said cross ways and the lateral deviation of said axis produced by said plate, a resolver connected between said energizing means and said one member, and servomechanism operable on said photoelectrically generated signal, said last-named servomechanism being coupled to said plate and to said resolver, the coupling between said resolver and plate being such that the lateral deviation of said axis produced by said plate is equal to the shift in said positional relation corresponding to the change imposed by said resolver on the signals with which said one member is energized.

7. A control for a machine having a carriage movable along guide ways providing a longitudinal path and a cross slide movable on said carriage transversely of said path, said control comprising a digital input of values representing command positions of said cross slide, a digital-to-analog converter for said input, a servo having coarse and fine data elements controlled by said converter for positioning said cross slide in accordance with coarse and fine increments of said input, means for operating said carriage, means to detect departure of said longitudinal path from linearity as said carriage moves along said guide ways, and means to correct said fine increment in accordance with the departure thus detected.

8. A control for a machine having a carriage movable along guide ways providing a longitudinal path and a cross slide movable on said carriage transversely of said path, said control comprising means to detect departures of said path from linearity as said carriage moves along said guide ways, a digital input of values representing command positions of said cross slide, a digital-to-analog converter for said input and a servo controlled by said converter and by said detecting means for operating said cross slide.

References Cited in the file of this patent
UNITED STATES PATENTS

| | | |
|---|---|---|
| 2,421,012 | Chew | May 27, 1947 |
| 2,430,924 | Fowle et al. | Nov. 18, 1947 |